United States Patent
Suryanarayana et al.

(10) Patent No.: US 10,789,062 B1
(45) Date of Patent: Sep. 29, 2020

(54) SYSTEM AND METHOD FOR DYNAMIC DATA DEDUPLICATION FOR FIRMWARE UPDATES

(71) Applicant: DELL PRODUCTS, LP, Round Rock, TX (US)

(72) Inventors: Shekar Babu Suryanarayana, Bangalore (IN); Anand P. Joshi, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 16/388,143

(22) Filed: Apr. 18, 2019

(51) Int. Cl.
*G06F 8/65* (2018.01)
*G06F 3/06* (2006.01)

(52) U.S. Cl.
CPC .............. *G06F 8/65* (2013.01); *G06F 3/0608* (2013.01); *G06F 3/0641* (2013.01); *G06F 3/0673* (2013.01)

(58) Field of Classification Search
CPC ........ G06F 3/0641; G06F 3/0608; G06F 8/65; G06F 3/0673
See application file for complete search history.

(56) References Cited

U.S. PATENT DOCUMENTS

| | | | |
|---|---|---|---|
| 7,623,378 B1 | 11/2009 | Wahlstrom et al. | |
| 8,707,297 B2 | 4/2014 | Brown et al. | |
| 10,146,786 B2 | 12/2018 | Brosch | |
| 2006/0174240 A1* | 8/2006 | Flynn | G06F 9/4406 717/170 |
| 2012/0109907 A1* | 5/2012 | Mandagere | G06F 16/215 707/692 |
| 2012/0131025 A1* | 5/2012 | Cheung | G06F 16/122 707/755 |
| 2012/0137054 A1* | 5/2012 | Sadri | G06F 3/0641 711/103 |
| 2012/0159468 A1 | 6/2012 | Joshi et al. | |
| 2012/0166401 A1* | 6/2012 | Li | G06F 16/215 707/692 |
| 2012/0260021 A1* | 10/2012 | Rudelic | G06F 3/0641 711/103 |
| 2014/0244599 A1* | 8/2014 | Zhang | G06F 3/0683 707/692 |
| 2015/0019815 A1* | 1/2015 | Aronovich | G06F 3/0641 711/129 |
| 2016/0239685 A1 | 8/2016 | Li et al. | |
| 2017/0131994 A1* | 5/2017 | Middleton | G06F 8/65 |
| 2017/0194052 A1 | 7/2017 | Schmier et al. | |
| 2017/0286082 A1* | 10/2017 | Zhu | G06F 8/61 |
| 2017/0351697 A1 | 12/2017 | Brosch | |
| 2019/0324674 A1* | 10/2019 | Ippatapu | G06F 3/0641 |

\* cited by examiner

*Primary Examiner* — Wei Y Zhen
*Assistant Examiner* — Amir Soltanzadeh
(74) *Attorney, Agent, or Firm* — Larson Newman, LLP

(57) ABSTRACT

A method for updating firmware includes receiving a firmware update package having a firmware image, and deduplicating the firmware image. The deduplicating may include dividing the firmware image into data blocks and determining a pattern in the data blocks. The method generates a global data deduplication table including an index array associated with the data patterns, and updates the firmware with the deduplicated firmware image. The method invokes an initialization procedure that includes execution of the updated firmware, and restores the updated firmware based on the global data deduplication table prior to the execution.

20 Claims, 8 Drawing Sheets

US 10,789,062 B1

SYSTEM AND METHOD FOR DYNAMIC DATA DEDUPLICATION FOR FIRMWARE UPDATES

FIELD OF THE DISCLOSURE

The present disclosure generally relates to information handling systems, and more particularly relates to dynamic data deduplication for firmware updates.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for updating firmware includes receiving a firmware update package having a firmware image, and deduplicating the firmware image. The deduplicating may include dividing the firmware image into data blocks and determining a pattern in the data blocks. The method generates a global data deduplication table including an index array associated with the data patterns, and updates the firmware with the deduplicated firmware image. The method invokes an initialization procedure that includes execution of the updated firmware, and restores the updated firmware based on the global data deduplication table prior to the execution.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the figures is provided to assist in understanding the teachings disclosed herein. The description is focused on specific implementations and embodiments of the teachings and is provided to assist in describing the teachings. This focus should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources.

Figure 1:
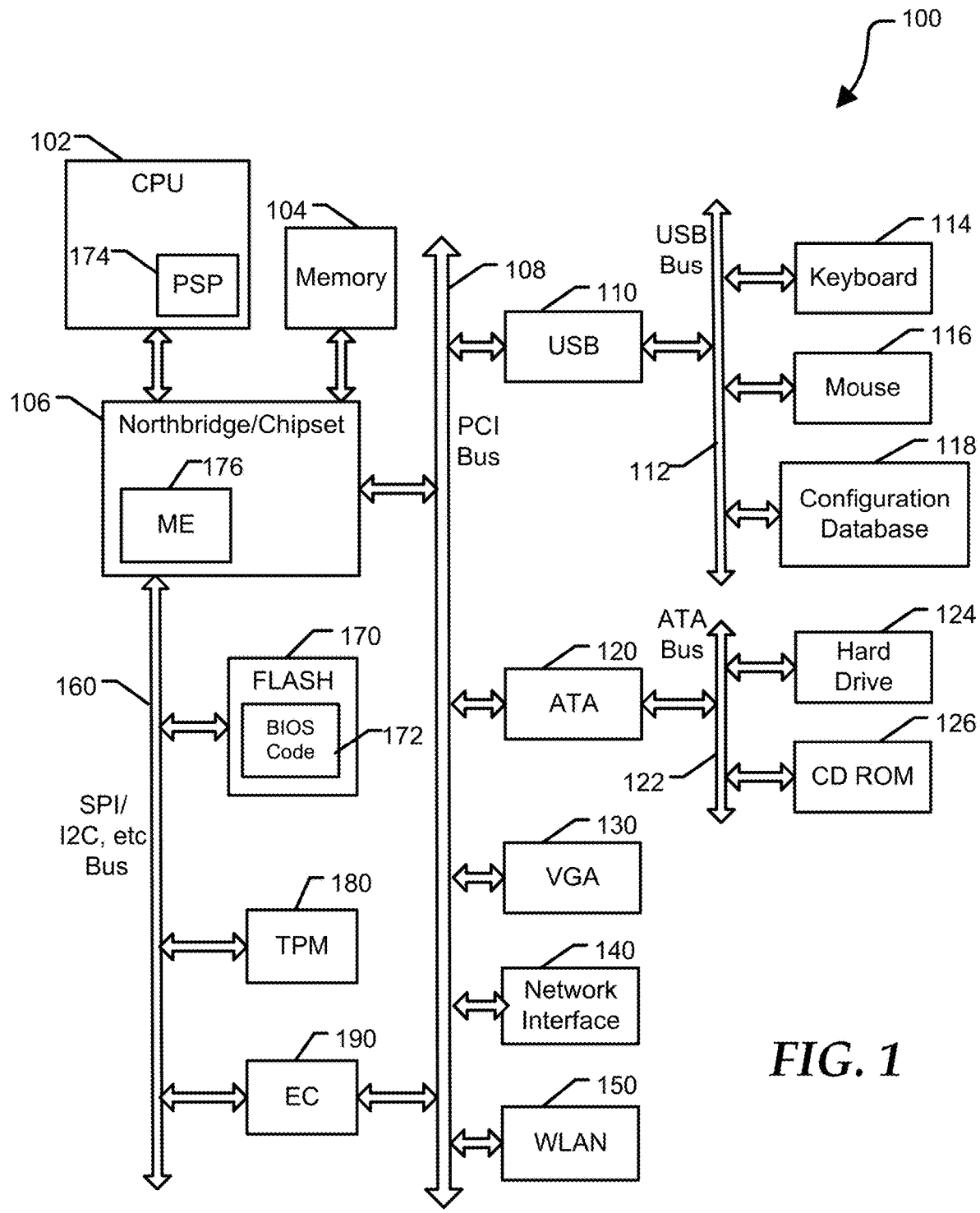
FIG. 1 is a block diagram of an information handling system according to an embodiment of the present disclosure.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a flash memory device 170 for storing basic input/output system (BIOS) code 172, a trusted platform module (TPM) 180, and a embedded controller (EC) 190. EC 190 can be referred to as a service processor, and an embedded controller, and the like. Flash memory device 170 can be referred to as an SPI flash device, BIOS non-volatile random-access memory (NVRAM), and the like. EC 190 is configured to provide out-of-band access to devices at information handling system 100. As used herein, out-of-band access herein refers to operations performed without the support of CPU 102, such as prior to execution of BIOS code 172 by processor 102 to initialize operation of information handling system 100. In an embodiment, information handling system 100 can further include a platform security processor (PSP) 174 and/or a management engine (ME) 176. In particular, an x86 processor provided by AMD can include PSP 174, while ME 176 is typically associated with systems based on Intel x86 processors.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of information handling system 100, PSP 174 is configured to authenticate the first block of BIOS code stored at flash memory device 170 before releasing the x86 processor from reset. Accordingly, PSP 174 provides a hardware root of trust for information handling system 100. ME 176 provides similar functionality in Intel-based systems. In another embodiment, EC 190 can provide aspects of a hardware root of trust. The root of trust relates to software processes and/or hardware devices that ensure that firmware and other software necessary for the operation of an information handling system is operating as expected.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. For example, portions of chipset 106 can be integrated within CPU 102. In an embodiment, chipset 106 can include a platform controller hub (PCH). Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable media for storing machine-executable code, such as software or data.

BIOS code 172 can be referred to as a firmware image, and the term BIOS is herein used interchangeably with the term firmware image, or simply firmware. In an embodiment, BIOS code 172 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

BIOS code 172 includes instructions executable by CPU 102 to initialize and test the hardware components of information handling system 100 and to load a boot loader or an operating system (OS) from a mass storage device. BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of information handling system 100 are configured and enabled for operation, and device drivers can be installed. Device drivers provide an interface through which other components of the information handling system 100 can communicate with a corresponding device.

Many information handling systems include one or more devices that process instructions from and operate on the basis of firmware embedded in or near the device. Firmware is a program code embedded in a device and maintained within or near the device. The firmware for a device most often makes up the operational code for the device. Firmware is often stored in flash memory, a class of memory that is rewritable. During the lifetime of the information handling system, it may become necessary or advisable to update the firmware such as the BIOS with a new version having one or more firmware revisions. This procedure is often referred to as flashing the BIOS. During this process, the previous BIOS can be deleted, and the revised BIOS can be stored at the flash memory device. The storage capacity of the flash memory device is typically limited to 32 MB or 64 MB of data. The space constraint restricts the size of the firmware revisions.

Data deduplication is a technique to reduce redundant data. Deduplication improves storage utilization and bandwidth utilization. By identifying data patterns, the size of the firmware update is dramatically reduced allowing for additional revisions and/or firmware capabilities within the limited storage capacity of the flash memory device and bandwidth capabilities during data transmission. Techniques are disclosed herein for dynamic data deduplication of firmware updates. By deduplicating the new version of the BIOS prior to flashing, additional features may be added to the firmware despite the space constraint. During an initialization sequence, the BIOS is then restored prior to execution.

Figure 2:
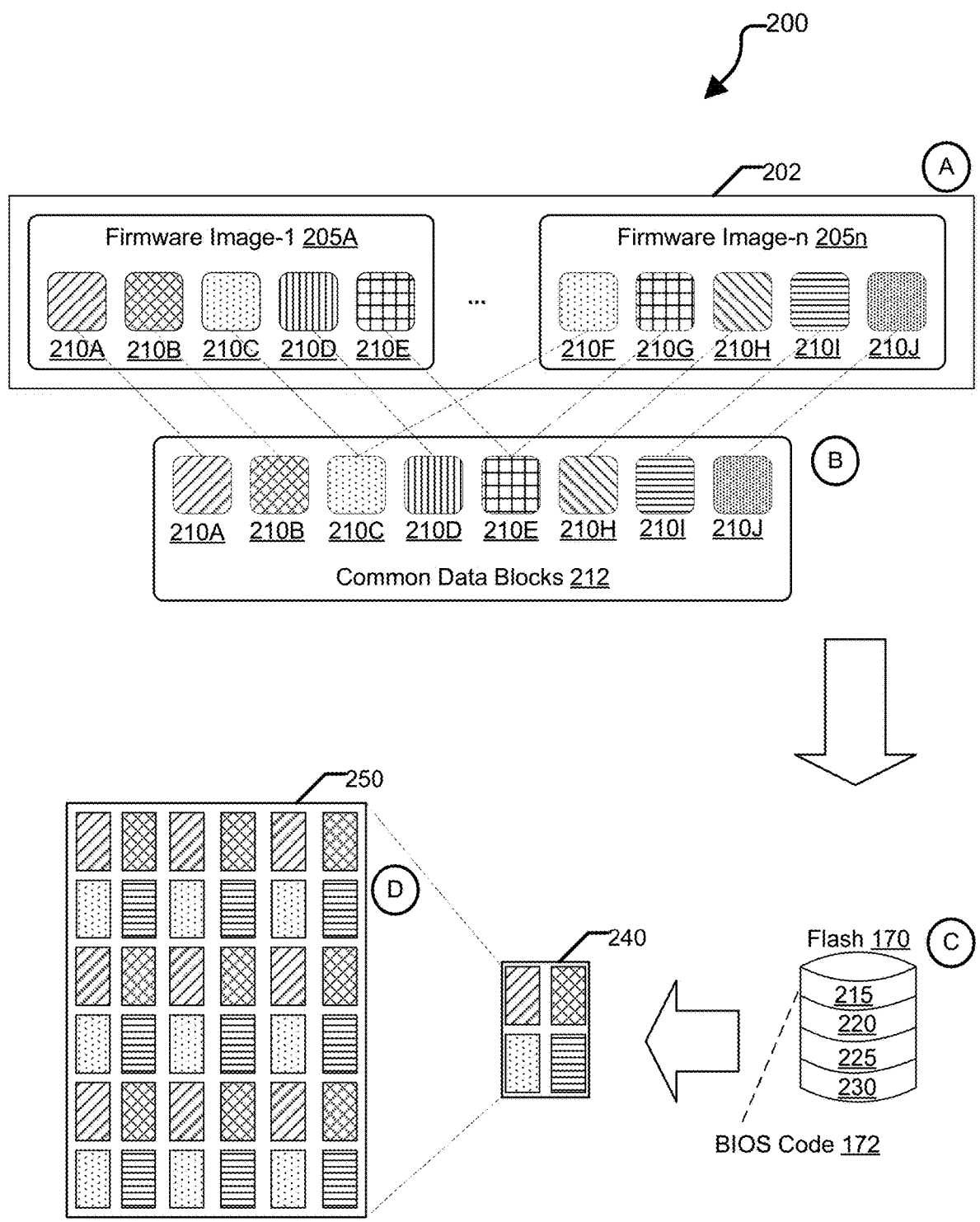
FIG. 2 is a block diagram illustrating dynamic data deduplication and restoration of firmware updates, according to a specific embodiment of the present disclosure.

FIG. 2 shows a firmware deduplication system 200 illustrating dynamic data deduplication and restoration for firmware updates. Firmware deduplication system 200 includes a firmware update package 202 with firmware image-1 205A through firmware image-n 205n. Each firmware image may include one or more data blocks. For example, firmware image-1 205A includes data blocks 210A through 210E while firmware image-n 205n includes data blocks 210F through 210J. Firmware deduplication system 200 also includes common data blocks 212, flash memory device 170, table 240, and restored data 250.

FIG. 2 is annotated with a series of letters A-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, the information handling system may receive a firmware update package that includes at least one firmware image. During the update process, the firmware image is deduplicated prior to flashing the flash memory device 170. The flash memory device 170 may be an SPI flash device configured to store initial boot block firmware instructions. Data deduplication as used herein refers to the ability of a system to eliminate data deduplication across firmware images to increase storage, transmission, and/or processing efficiency. Each firmware image that has been processed or deduplicated is referred to herein as a deduplicated firmware image. It should be noted that a deduplicated firmware image is not necessarily compressed, but an optimized firmware image can be compressed and/or deduplicated.

Deduplicating the firmware image may include dividing the firmware image into data blocks. The size of the data blocks may be pre-determined or dynamically determined and varied based on one or more assumptions. For example, if the network bandwidth is slow, an update manager that may be processing the firmware image may dynamically determine to deduplicate the firmware image after generating the firmware update package that includes the firmware image prior to transmitting the firmware update package with the firmware image to the information handling system. For example, a firmware image of 256 bytes may be reduced to 48 bytes with a data deduplication table of 32 bytes totaling to 80 bytes of data. Further, the update manager may determine that the 80 bytes of data should be further reduced. The update manager may then calculate a hash signature to further reduce the data to 16 or 24 bytes. The hash signature may be used to determine and restore the deduplicated data. In another embodiment, the firmware image of 256 bytes may be received by the information handling system and then reduced or deduplicated prior to storage in the flash memory device. The data blocks may be analyzed to determine if there are patterns in the data contained in the data blocks. For ease of illustration, each data block has a different data pattern as shown by the fill patterns of data blocks 210A through 210E in firmware image-1 205A. Also illustrated, are the different data patterns of data blocks 210F through 210J in firmware image-n 205n.

At stage B, data blocks with the same data patterns are identified. Each data block may be verified for uniqueness. Instances of the data block and/or the data pattern with duplicates are identified and stored in a common pool such as common block 212. There are various ways to identify whether a data block is common or a duplicate of another data block such as through the use of hash signatures. A hash signature may be generated for each data block, sub-block, a set of data blocks, a set of sub-blocks, etc. The hash signatures may be used to verify that the data block has not been changed, whether the data blocks are the duplicates or similar, and/or whether the data blocks include the same data patterns. The hash signature may also be used to identify an offset of a particular deduplicated data and how to restore it. In this example, because data block 210C has the same data pattern as data block 210F, the data blocks may have the same hash signatures. A unique instance of the duplicate data block may be stored in a pool of repeated or duplicate data. The hash signatures of the data blocks may be similar if the data patterns of the data blocks are similar. For example, if the data patterns in the data blocks are the same but for a data chunk of 2 bytes in the first data block, then the two data blocks are similar. Data chunks may refer to the non-repeated data left in the data block after the determined data patterns are removed from the data block. The similarity of data blocks may be based on a threshold which may be pre-determined by an administrator or user prior to the deduplication process. Deltas between the two similar data blocks may be determined based on the comparison of the hash signatures of each data blocks. The deltas between the two data blocks may be stored in a pool of unique data. Because data block 210C and data block 210F have the same data pattern, only data block 210C may be stored in common data blocks 212. A reference or pointer to data block 210C may replace data block 210F in firmware image-n 205n. Because data block 210E and data block 210G have the same data pattern, only data block 210E may be stored in common data blocks 212. A reference or pointer to data block 210E may replace data block 210G in firmware image-n 205n.

The common data blocks can be deduplicated to remove redundancy in storing the data blocks. Deduplicating the firmware images includes analyzing the data blocks in the firmware images. If the same data block is not found in the pool of common data blocks, a new data block is added to the pool. If the same data block is found in the pool, the data block may not be added to the pool. Instead, the data block may be replaced with a pointer to its duplicate in the pool such as common data blocks 212 thus reducing the size of the firmware image. During the analysis, the hash signatures of one data block may be calculated and compared to the hash signature of another data block determine if they are identical or duplicates. In another embodiment, the data blocks may be compared to determine if they are similar based on pre-defined similarity criteria. A similarity threshold may also be identified to track how similar two data blocks are.

A table such as a global data deduplication table (GDDT) may be generated to keep track of the data blocks and/or data patterns in common data blocks 212. Metadata regarding each data block in common data blocks 212 such as a source offset, a start offset, an end offset, data block size, data block signature and/or pointer may be maintained in the GDDT. In addition, the GDDT may also include the hash signatures calculated earlier. The GDDT may be stored in a header of the flash memory device such as an SPI flash header. The GDDT may be a secure table which is protected with one or more authorization keys.

At stage C, the deduplicated firmware images are stored or flashed in a nonvolatile memory such as flash memory device 170 along with the GDDT. Flashing the deduplicated firmware image may also mean updating the firmware image in the flash memory device. Each firmware image may occupy its own data store or firmware region in flash memory device 170. For example, BIOS code 172 may occupy store 215, NIC firmware may occupy store 220, EC firmware may occupy store 225, and ME firmware may occupy store 230. GDDT may be stored in a superblock header (not shown) in the flash memory device 170. In another embodiment, the GDDT may be stored in a different non-volatile memory such as a trusted platform module (TPM).

At stage D, during a boot process, the deduplicated firmware images may be restored prior to its execution. Because the firmware image has been deduplicated to allow for space requirements, the processor cannot execute the stored firmware images in the flash memory device 170 without restoring the firmware images. The restoration may be performed using the hash signatures and other information in the GDDT. Offsets associated with each data block in the common data table and in its location with the associated data blocks in the firmware images may be identified and the data block restored or regenerated as shown in restored data 250. The restored firmware image may be held in the processor cache during the execution. If the processor cache is to be flushed, the restored firmware image may be transferred to a new location in main memory and a cache reconfigured as part of the initialization. Data reads and/or data write may then be directed to use the new location.

Figure 3:
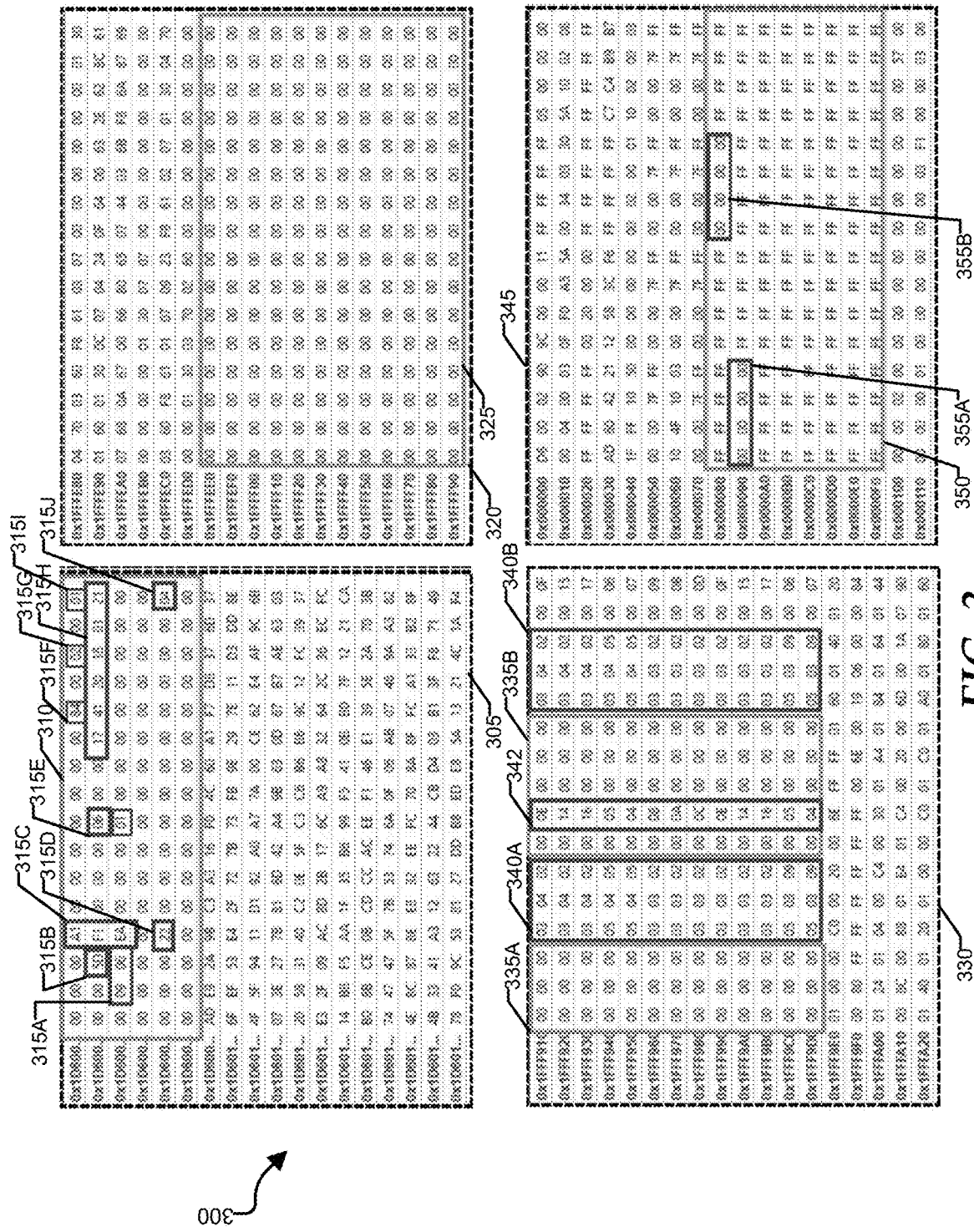
FIG. 3 shows an example of data blocks and data patterns, according to a specific embodiment of the present disclosure.

FIG. 3 shows an example of data blocks 300 which illustrates the data blocks in FIG. 2 in greater detail. The example data blocks include a data block 305, a data block 320, a data block 330, and a data block 345. Each of the data blocks belongs to the same firmware image or to different firmware images. For example, data block 305 may be from the BIOS firmware; data block 320 may be from the NIC firmware; data block 330 may be from the EC firmware, and data block 245 may be from the ME firmware. For ease of illustration, assume that a scanner algorithm has been applied to the data blocks, where the scanner algorithm determined duplicate and/or similar data patterns as shown. The data patterns are shown as sub-blocks. Data block 305 includes a sub-blocks 310 which includes sub-blocks 315A-315J. Data block 320 includes a sub-block 325. Data block 330 includes sub-blocks 335A and 335B and sub-blocks 340A-340C. Data block 345 includes a sub-block 350 which includes sub-blocks 355A-355B.

The size of the data blocks may be fixed, pre-determined, or dynamically determined at runtime based on one or more assumptions. In addition, each data block may be the same size or vary in size. Each data block may include duplicate, repeated, and/or unique data patterns. A deduplication algorithm may eliminate duplicate and/or repeated data patterns. In its place, pointers to an instance of the duplicate or repeated data pattern may be used. Data patterns may be classified into different types: uniformly repeated data patterns, unique data in the repeated data patterns, non-unique data patterns, and duplicate data patterns. The uniformly repeated data patterns may be data patterns that are repeated uniformly within a data block. The uniquely repeated patterns include data patterns that are unique to other data patterns within the data block. The unique data in the repeated data patterns includes unique data identified within the data patterns such as the uniformly repeated patterns, the uniquely repeated data patterns, and the duplicate data patterns. The non-unique data patterns may include data patterns but are not apparent on its face, that is uniqueness may be difficult to determine. Examples of the data patterns are shown below:

| | |
|---|---|
| Uniformly repeated data patterns | *00 01 08 A0* 00 01 08 A0 00 01 08 A0 00 01 08 A0 |
| Uniquely repeated data patterns | *AA AA AA AA AA AA AA* 00 AB AB AB AB AB AB AB 02 AC AC AC AC AC AC AC |
| Non-unique data patterns | AB 23 *09 00 00* AB CD 45 76 20 12 AB 23 02 |
| Duplicate data patterns | *00 00 00 00 00 00 00 00 00 00* |

In the examples above, uniformly repeated patterns show data pattern "00 01 08 AO" repeated uniformly. Uniquely repeated data patterns show several unique data patterns such as "AA AA AA AA AA AA AA," "AB AB AB AB AB AB AB," and "AC AC AC AC AC AC." As shown, each of the uniquely repeated data patterns may have one or more unique data units separating each data pattern. A data unit may be digital information that encodes a single character of text. Non-unique data patterns show a data pattern "AB 23" and "00." Shown above is "00 00 00 00 00 00 00 00 00 00" as a duplicate data pattern, where every data in the data block may be the same.

Sub-block 310 may be classified as a uniquely repeated data pattern. As shown sub-block 310 includes repetition of the American Standard Code for Information Interchange (ASCII) code "00" for a portion of data block 305 except for sub-blocks 315A-315J which contains non-repeated or unique data. Sub-block 325 may be classified as a uniquely repeated data pattern. Sub-block 310 may be identified by its size, start offset, and end offset less the sizes, start offsets, and end offsets of sub-blocks 315A-315J. As shown, sub-block 325 includes repetition of ASCII code "00." Sub-block 325 may be identified by its size, start offset, and end offset.

Sub-blocks 335A and 335B may be classified as a uniquely repeated data pattern. As shown, sub-block 335A includes repetition of ASCII code "00." Sub-block 335B also includes repetition of ASCII code "00" except for sub-block 342. Sub-block 342 as shown includes unique data with no distinguishing pattern. Sub-block 342 may have been identified so as to exclude this data chunk from an otherwise entire sub-block of ASCII codes "00" 's. For example, sub-block 335B may be identified by its size, start offset, and end offset less the size, start, and end offset of sub-block 342. Sub-block 340A-340B may be classified as uniformly repeated data pattern. As shown, sub-blocks 340A-340B includes ASCII codes "03 04 02" in a repeated pattern.

Sub-block 350 may be classified as a uniquely repeated data pattern. As shown sub-block 350 includes repetition of ASCII code "FF" for the most part except for sub-blocks 355A and 355B which includes ASCII code "00." Sub-block 350 may be classified as a uniquely repeated data pattern. Sub-blocks 355A-355B may also be classified as a uniquely repeated data pattern. Sub-block 350 may be identified by its size, start offset, and end offset less the sizes, start offsets, and end offsets of sub-blocks 355A-355B.

Figure 4:
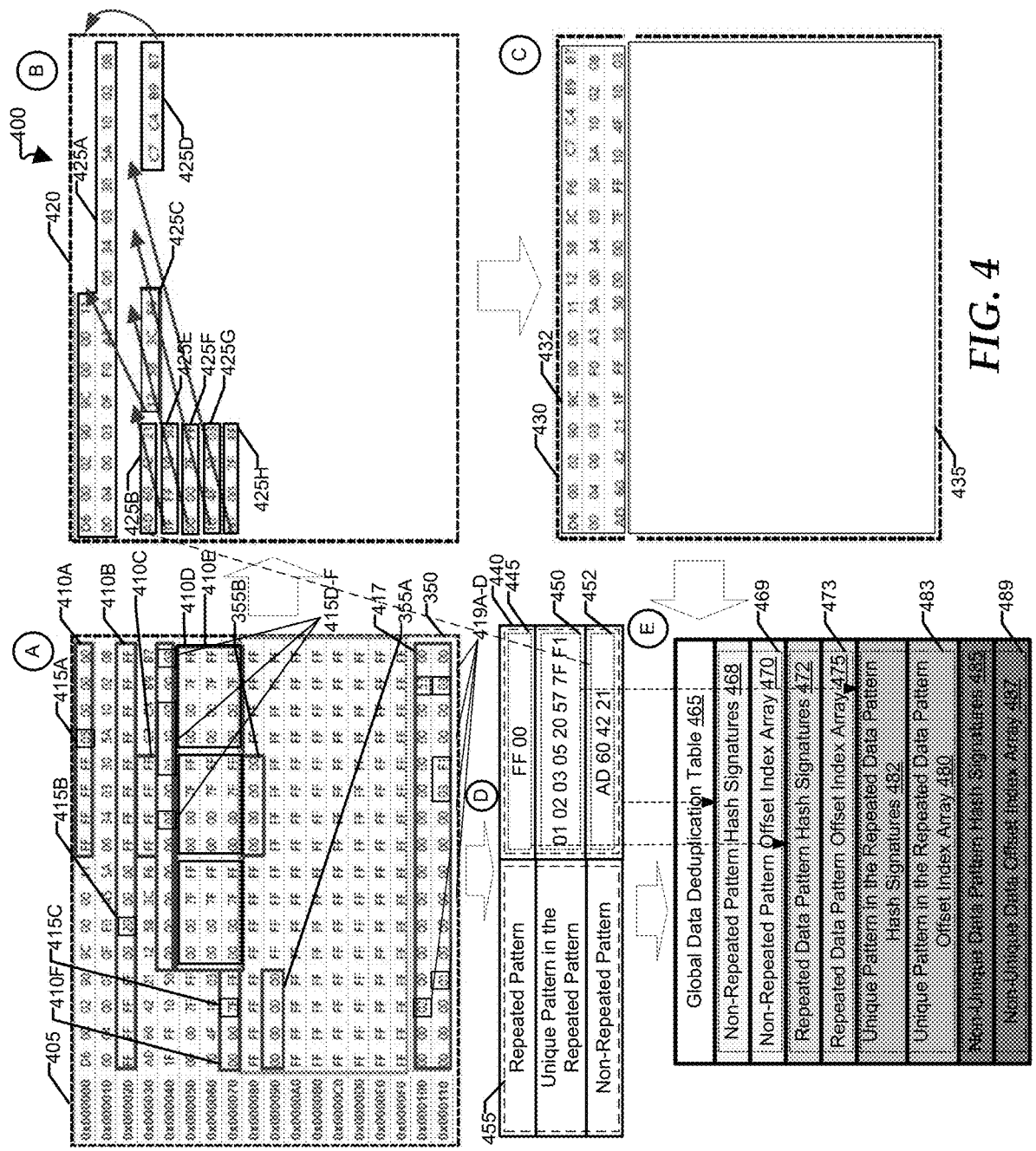
FIG. 4 shows a graphical representation illustrating a data block deduplication according to a specific embodiment of the present disclosure.

FIG. 4 shows a graphical representation 400 illustrating data deduplication of data block 345 of FIG. 3. The graphical representation 400 includes a data pattern table 440, a GDDT 465, and a data block 405 that transitioned from data block 345 of FIG. 3. The graphical representation 400 also includes data block 420 that transitioned from data block 405 and data block 430 that transitioned from data block 420.

FIG. 4 is annotated with a series of letters A-E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, an optimizer (not shown) may scan a particular data block to determine whether the particular data block contains one or more of the different types of data patterns. A variety of deduplication algorithms may be applied to the data blocks to identify the data patterns to allow for more efficient deduplication, compression, storage, and retrieval of the firmware image. The analysis algorithm may be a learning algorithm, a content-based analysis algorithm, or similar. For example, the optimizer may identify the ASCII code in the lowest offset of the data block. The optimizer may then scan the neighboring offsets to determine whether the ASCII code is repeated. If the neighboring offsets are occupied by the same ASCII code, then the scan radius may be larger by scanning the neighboring offsets of the previously scanned neighbors and so on. The optimizer may also keep track of whether there is a unique data within an identified uniformly repeated data pattern. In another example, the optimizer may use a data pattern template to determine if the data of the particular data block fits the template.

After initially identifying sub-blocks 350, 355A, and 355B in data block 345 of FIG. 3, the optimizer identified additional data patterns such as sub-blocks 410A-410F, sub-blocks 415A-415F, a sub-block 417, and sub-blocks 419A-419D. In this example, sub-block 350 mostly includes a uniquely repeated data pattern of "FF" aside from sub-blocks 355A and 355B which includes a uniquely repeated data pattern of "00." Sub-block 417 which includes a uniquely repeated data pattern of ASCII code "00" may also be identified. Sub-block 417 includes sub-blocks 419A-419D which are unique non-repeated data. Sub-block 410E includes a uniquely repeated data pattern of "00 00 7F FF" as shown.

As the analysis continues, other data patterns may be found and identified as sub-blocks or data chunks. The identified sub-blocks may be compared and/or matched to other identified sub-blocks. A match frequency may depend at least in part on the size of the data block and/or sub-block. Different firmware images may use different data block sizes or may support variable data block sizes. Data block sizes may be selected based on considerations such as a firmware type, desired deduplication dictionary size, desired reduction ratios, network bandwidth, etc. The sub-blocks may be removed or replaced with a reference that points to an instance of the identified data patterns. Given that the data patterns may occur dozens, hundreds, or even thousands of times, the amount of data that must be stored is greatly reduced. However, this may leave the data block fragmented data block that may result in suboptimal access times.

At stage B, the identified data patterns may be removed from the data block. The optimizer may maintain a deduplication database such as the GDDT to keep track of the identified data patterns and its metadata such as its size and location as shown in stage E. The hash signatures may also be calculated before and/or after the data patterns are removed from the data block.

Because the non-repeated data or the remaining data after the sub-blocks have been removed may be fragmented, the remaining data may be re-arranged contiguously or defragmented. For example, the fragmented non-repeated data may be consolidated into a contiguous space in the data block. A defragmenting module (not shown) of the optimizer may identify free spaces that could accommodate the remaining data. The remaining data may be grouped into sub-blocks. Each sub-block may be then moved to free space in the data block. New offsets associated with the re-arranged sub-blocks may be identified. The new arrangement may allow for substantially sequential access of the sub-blocks, which may in at least some instances provide significantly reduced access time of the sub-blocks. For instance, instead of reading a group of data that are located separately at different areas of the data block, the storage system may read one or more contiguous or nearly contiguous blocks of data. Memory mappings may be generated to identify the new arrangement. Because the re-arranged sub-blocks may be moved back to its original location, a memory map of its original location may be maintained.

At stage C, data block 430 is shown after the defragmentation of data block 420. Data block 430 includes a contiguous free space or sub-block 435. Data block 430 also includes a contiguous space 432 which includes the consolidated remaining data. At stage D, a data structure such as data pattern table 440 of data patterns such as common data patterns and unique data may be maintained. Data pattern table 440 may also maintain the non-repeated data. Deduplication may include storing a single instance of a data block, a data unit, a data segment or sub-block that is common across data blocks in the firmware images. In addition, deltas between data blocks, data units, and sub-blocks such as similar data blocks, data units, and sub-blocks may be stored and maintained. A data unit may be a single character encoding such as an ASCII code, a hexadecimal value, a Unicode encoding, a universal coded set encoding, etc. Each data block, data unit, sub-block or stored duplicate and/or delta may have an identifier (ID), such as a digital signature, mathematical representation, or the actual data. In addition, pointers and/or offsets that relate to the size and location of the data relative to its original data block, a data unit, or sub-block is maintained which is used during the restoration of the data block. Finally, each data block, each data unit, or each sub-block may have unique ID or reference such as a hash signature, a cyclic redundancy check (CRC), or the like.

Data pattern table 440 may also include the unique data that was identified within the data patterns. Data pattern table 440 may store the smallest data unit of the repeated data patterns. The data pattern may be a set of data units. The data pattern may include one or more data units. The data unit may be stored in a table, an array, a list, a data dictionary, or similar data structure. For example, a cell 445 includes "FF" and "00." Table 440 may also store the unique data identified within the data patterns. For example, a cell 450 includes "01," "02," "03," "05," "20," "57," "7F," and "F1." Table 440 may also store the non-repeated data. For example, a cell 452 includes "AD 60 42 21" that is sub-block 425B, as shown. Other data patterns determined are not shown in data pattern table 440 for ease of illustration.

At stage E, a GDDT 465 may be generated and maintained. GDDT 465 may be a centralized table that keeps track of the different types of data patterns and/or sub-blocks for all the firmware images such a hash signature, a reference or pointer to the unique instance of the data pattern and/or sub-block, its size and location. The GDDT may also be used to keep track of the size and location of a data block and/or a set of data blocks. The GDDT 465 may be used to keep track of deduplicated data of the firmware images in the firmware update package or in the non-volatile storage device such as the flash memory device or in particular the SPI flash device. The location may include a start offset and an end offset of the sub-block and/or the data block that contains the data pattern. The location may also include, a start offset and an end offset of the data pattern, unique data in the repeated data pattern, etc. GDDT 465 may include one or more hash signatures, references, or pointers to a location of the hash signatures such as a non-repeated hash signatures 468, a repeated data pattern hash signatures 472, a unique pattern in the repeated data pattern hash signatures 482, and a non-unique data pattern hash signatures 485. Hash signatures for other types of data pattern such as the duplicate data pattern, the uniquely repeated data pattern, etc. (not shown) may be included in GDDT 465. GDDT 465 may include one or more index arrays such as a non-repeated pattern offset index array 470, a repeated data pattern offset index array 475, a unique pattern in the repeated data pattern offset index array 480, and a non-unique data offset index array 487. Index arrays for other types of data pattern such as duplicate data pattern, uniquely repeated data patterns, etc. (not shown) may be included in GDDT 465. Each entry in the GDDT may include the hash signatures and the index array. For example, an entry 469 includes non-repeated hash signatures 468 and non-repeated pattern offset index array 470. An entry 473 includes repeated data pattern hash signatures 472 and repeated data pattern offset index array 475. An entry 483 includes a unique pattern in the repeated data pattern hash signatures 482 and unique pattern in the repeated data pattern offset index array 480. An entry 489 includes non-unique data pattern hash signatures 485 and non-unique data offset index array 487.

Entry 473 may include a reference to cell 445 of data pattern table 440. Entry 483 may include a reference to cell 450 of data pattern table 440. In addition, the GDDT may also be used to keep track of a reference to the hash signatures of the data blocks and/or sub-blocks. Index arrays identify the location where its respective data block and/or sub-block should go during the restoration as the indexes point to the offsets in the data block such as a deduplicated area.

In another embodiment, the deduplication of the firmware images may be performed during the build time of the firmware images instead of the runtime as illustrated above. As such, the firmware update package received may already be deduplicated. Thus, the firmware images may then be flashed to the flash memory device during the firmware update without further deduplication. In another embodiment, the deduplicated firmware images may be compressed prior to flashing.

Figure 5:
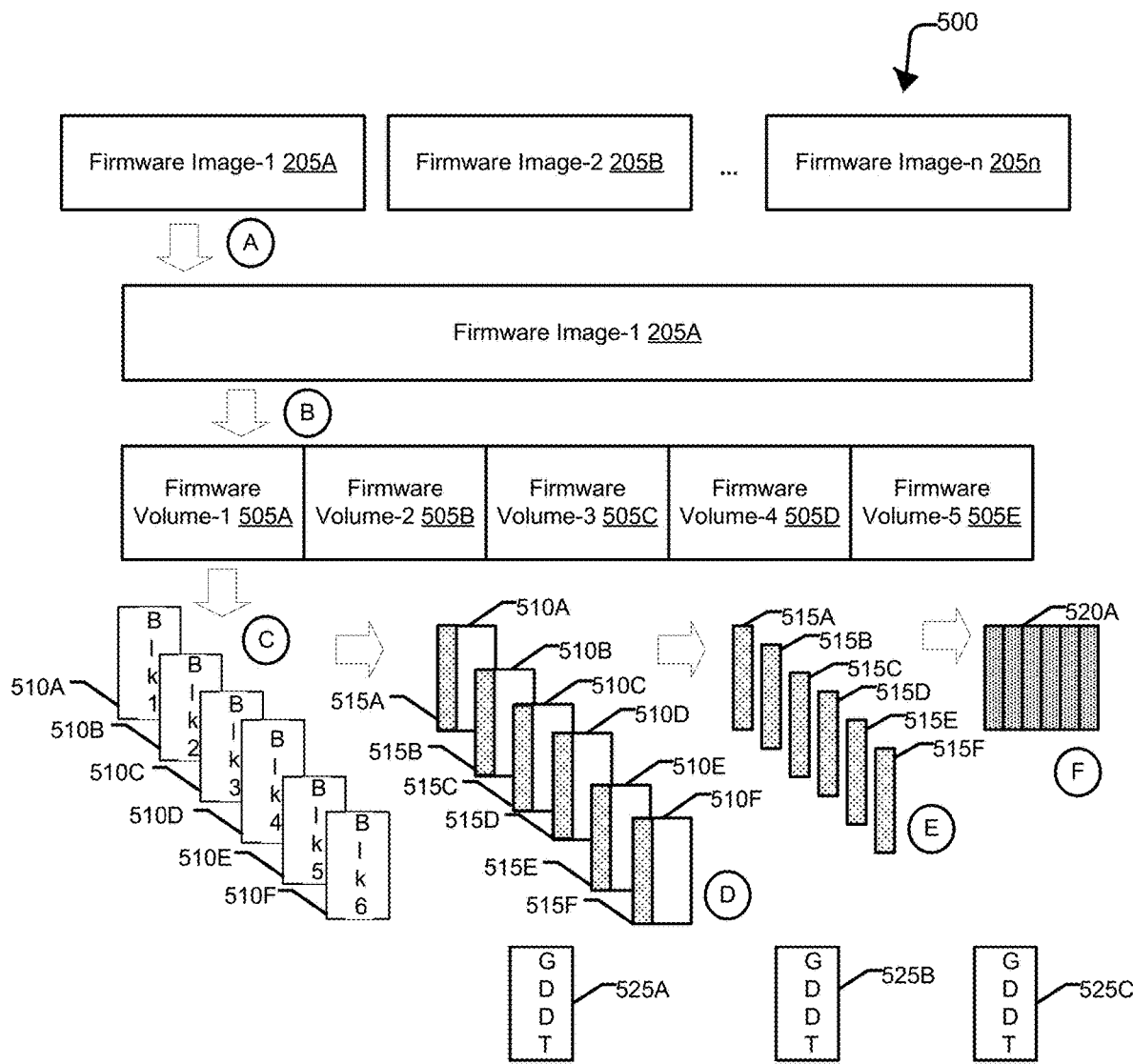
FIG. 5 is a block diagram showing deduplicating a firmware image according to a specific embodiment of the present disclosure.

FIG. 5 shows a deduplication process 500 of a firmware image. Deduplication process 500 includes a firmware image-1 205A, a firmware image-2 205B through a firmware image-n 205n. FIG. 5 is annotated with a series of letters A-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, a firmware image such as firmware image-1 205A is selected from identified firmware images in the update package. The firmware images may be identified via a header. The header may include the size and location of the firmware images in the firmware update package. At stage B, firmware volumes that comprise firmware image-1 205A are identified. As shown firmware image-1 205A includes a firmware volume-1 505A, a firmware volume-2 505B, a firmware volume-3 505C, a firmware volume-4 505D, and a firmware volume-5 505E.

At stage C, firmware volume-1 505A is selected and divided into one or more data blocks such as a blk1 510A, a blk2 510B, a blk3 510C, a blk4 510D, a blk5 510E, and a blk6 510F. At stage D, each of the data blocks is analyzed to identify data patterns. After identifying the data patterns, the identified data patterns are removed. The remaining data may then be re-arranged where the remaining data may occupy a contiguous area in the data block. The contiguous remaining data may be referred herein as a data chunk or sub-block. In this example, data block 510A includes a sub-block 515A, data block 510B includes a sub-block 515B, data block 510C includes a sub-block 515C, data block 510D includes sub-block 515D, data block 510E includes a sub-block 515E, data block 510F includes a sub-block 515F. A GDDT such as a GDDT 525A may be generated and associated with the firmware volume, data blocks and/or sub-blocks that are being deduplicated. The GDDT may be updated with identifiers and or references of the data patterns, its sizes, and/or locations. At stage E, the sub-blocks 515A through 515F are identified. The GDDT 525A may also be updated with the size and/or location of each of the sub-blocks which is shown as a GDDT 525B after the update. At stage F, the sub-block may be grouped together such as a data chunk 520A. GDDT 525B may also be updated with the size and/or location of the data chunks which is shown as a GDDT 525C after the update. Stages C through F may be repeated for each firmware volume of each of the firmware images in the firmware update package.

Figure 6:
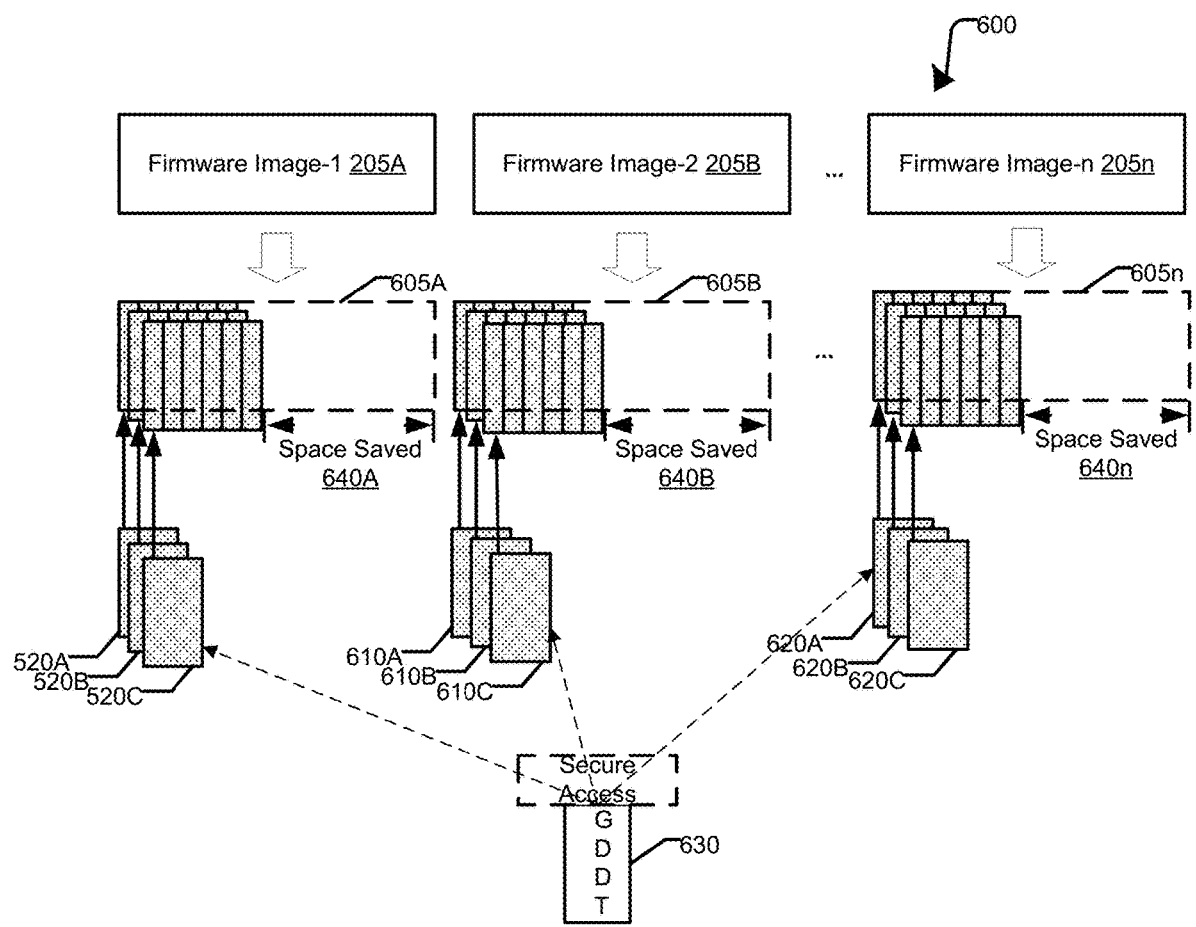
FIG. 6 shows an example of deduplicated firmware images according to a specific embodiment of the present disclosure.

FIG. 6 shows a deduplication process 600 after the deduplication of the firmware images. Deduplication process 600 includes a GDDT 630 and firmware image-1 205A, firmware image-2 205B through firmware image-n 205n. A firmware image 605A, a firmware image 605B, and a firmware image 605Cn are shown to illustrate space saved after deduplication. Space saved is not shown to scale but for illustration purposes only. Firmware image 605A includes data chunks 520A-520C and a space saved 640A after firmware image-1 205A has been deduplicated. Firmware image 605B includes data chunks 610A-610C and a space saved 640B after firmware image-2 205B has been deduplicated. Firmware image 605n includes data chunks 620A-620C and a space saved 640n after firmware image-n 205n has been deduplicated.

GDDT 630 may include information associated with the data patterns identified in each of the data blocks and sub-blocks of the firmware images and of the data blocks and sub-blocks. GDDT 630 entries may include hash signatures and index arrays of the identified data patterns, data blocks, and sub-blocks. The index arrays may include a range of offsets associated with the data patterns, data blocks, and sub-blocks. For example, the GDDT 630 may include an entry that is mapped to a range of offsets to identify locations and sizes of sub-blocks of identified data patterns in the data blocks. In particular, a range of offsets may identify a sub-block of uniformly repeated patterns less the range of offsets of the identified uniquely repeated data patterns within the aforementioned sub-block of uniformly repeated patterns. Another range of offsets may identify a reference to the unique data stored in the common pool. In another example, GDDT 630 may include an entry that is mapped to a range of offsets to identify locations of hash signatures associated with the data blocks. In yet another example, the entries in the GDDT may be a combination of both the aforementioned range of offsets.

Access to the GDDT may be secured by one or more cryptographic keys to prevent unauthorized access. A virtual trusted platform method (VTPM) may be implemented to manage the cryptographic keys. The VTPM may be implemented in a TPM. The TPM may include a dedicated, secure cryptoprocessor that is configured to secure hardware such as the flash memory device by integrating the cryptographic keys into the hardware. The TPM may be stored at a locked area of the lower offsets of the flash memory device and a redundant copy of the TPM may be stored at another non-volatile storage device such as an embedded multimedia card (eMMC), a non-volatile dual in-line memory module (NVDIMM), or the like. The TPM may also be locked or sealed at the factory that manufactured the TPM so that firmware updates may not erase the contents of the TPM such as the cryptographic keys. In another embodiment, the GDDT may be secured by a signature embedded in the GDDT with authorized signing certificates. Securing the GDDT may prevent booting a compromised firmware and/or unauthorized modification of the firmware images.

Figure 7:
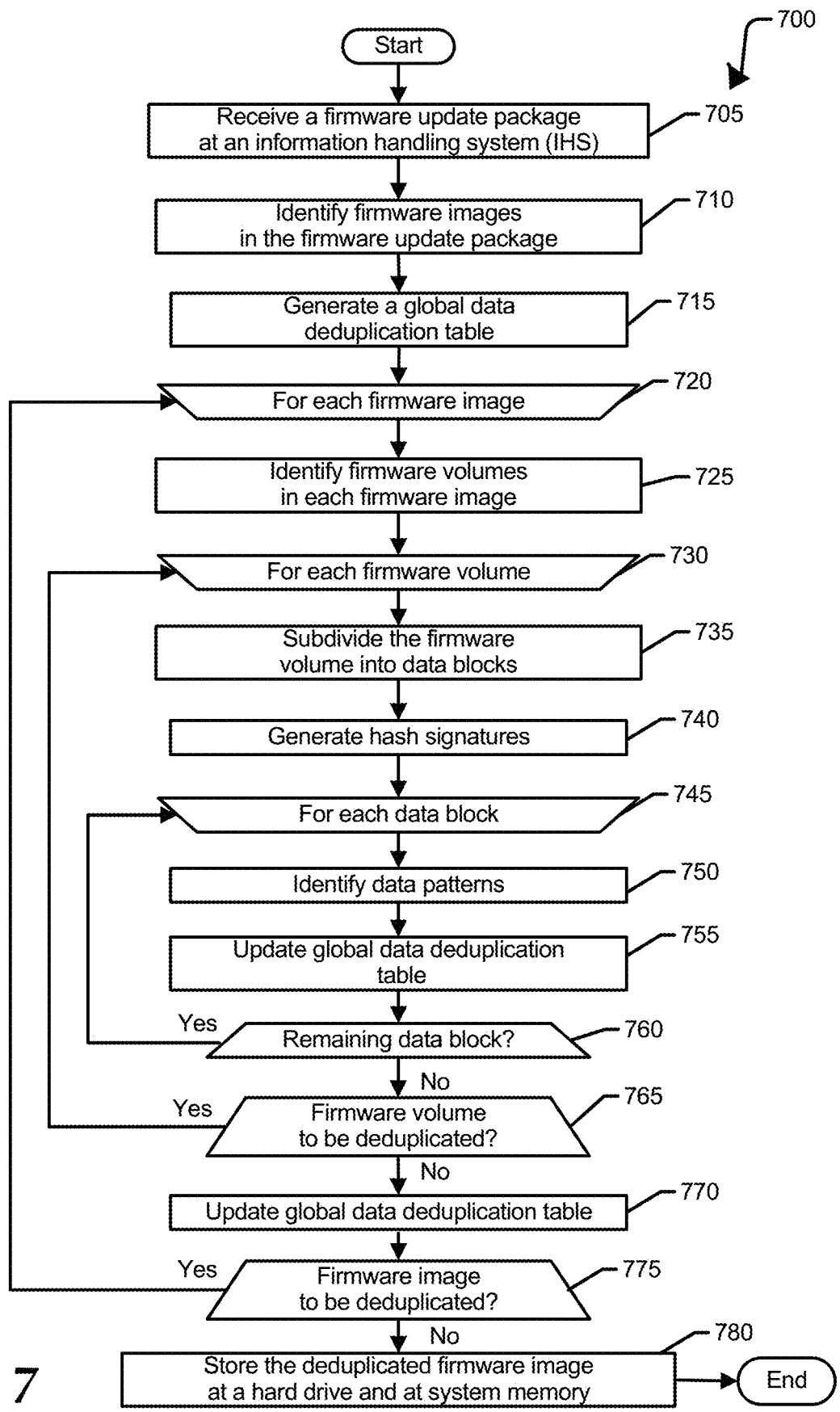
FIG. 7 is a flowchart illustrating an example of a method of deduplicating the firmware images according to a specific embodiment of the present disclosure.

FIG. 7 shows a method 700 for deduplicating the firmware images. The method 700 may be performed by an update manager. Method 700 begins at block 705 where the firmware update package is received. The firmware update package includes at least one firmware image. The firmware update package may be provided by a manufacturer of the information handling system or a supplier of a target device. For example, a user of the information handling system may download the firmware update package from a service provider, such as an original equipment manufacturer of a target device, the information handling system, and the like. In other cases, OS update services such as Windows update (WU) may deliver the firmware update package. In yet another case, the firmware update package may be received by a service processor from the host via a network or may be received by a CPU via the network.

The firmware update package may include a configuration file, an executable firmware flash program and a firmware image. The firmware image includes code that will be saved or flashed to a non-volatile memory space of a target as part of the firmware update process. The configuration file contains data regarding the firmware image. The configuration file may include, for example, a pointer to the firmware image and an indication of the length of the storage block that includes the firmware image or the firmware image. The configuration file may also include a firmware image list. The firmware image list may be a data structure, not necessarily a list, that identifies the firmware images included in the firmware update package. For example, the firmware image list may link hash signatures associated with each of the firmware images.

At block 710, the firmware images in the firmware update package are identified. Identifying the firmware images included in the firmware update package may be no more than reading the information contained in the configuration file such as a globally unique identifier (GUID) that may be established and maintained by the manufacturer of the target. The update manager may use also a hash signature associated with each firmware image to verify authenticity and version of the firmware image. As used herein, an update manager may be designed to build and/or manage firmware update packages for different types of information handling systems. The firmware update package may include programs and/or libraries needed to update, document, install, verify, and uninstall, each file in the firmware update package. The firmware update package may include a list of software packages that the update package depends on, called dependencies, and a list of services that are provided by the firmware update package.

At block 715, the GDDT may be generated. The GDDT may include information regarding the identified firmware images. The GDDT may include hash signatures and index arrays associated with identified data patterns in each data block and sub-block of the firmware image. At block 720, the update manager begins to evaluate the identified firmware images. The update manager can traverse the firmware images list as structured, or rearrange the firmware images based on various factors. The rearrangement may be based on the order of the GUID, hash signature, predetermined by the update manager and/or the user. The firmware being analyzed may be referred herein as a current firmware image. The update manager may set a flag after the current firmware image has been evaluated.

At block 725, the update manager identifies firmware volume(s) in the current firmware image. Each of the firmware images may include at least one firmware volume, each firmware volume may include at least one firmware file. The update manager may use the information in the configuration file, a header, or the like. At block 730, the update manager begins to evaluate the firmware volumes. The firmware volume being evaluated may be referred to as a current firmware volume. The update manager may set a flag after the current firmware volume has been evaluated.

At block 735, the update manager subdivides the current firmware volume into data blocks where each data block is a fixed or a dynamic size determined prior to or during runtime. At block 740, the update manager may generate or calculate hash signatures for the data blocks, firmware volume, firmware image, etc. The GDDT may be updated to store a hash signature for each data block, a reference, or a pointer to the hash signature. For example, the reference or pointer may identify the location of the hash signature or fingerprint for each data block and/or sub-block such as a table, a dictionary, an array, and the like.

At block 745, the method begins to evaluate the data blocks. The data block being evaluated may be referred to as a current data block. The update manager may set a flag after the current data block has been evaluated. At block 750, each data block may be analyzed to identify data patterns. The data block may be subdivided into sub-blocks based on the identified data patterns. Hash signatures for the sub-blocks may be calculated. At block 755, the update manager may update the GDDT with information associated with the identified data patterns such as the hash signatures, size, and location.

At block 760, if there is another data block to be analyzed, the update manager proceeds to analyze the next data block at block 745. Otherwise, the update manager proceeds to block 765. At block 765, if there is another firmware volume to be deduplicated, the update manager may proceed with the next firmware volume at block 730. Otherwise, the method may proceed block 770. At block 770, the method updates the GDDT with the new offsets after the firmware volume has been deduplicated. For example, the GDDT may be updated with offsets associated with data moved to various areas of the data block. After updating the GDDT, the method proceeds to block 775.

At block 775, if there is another firmware image to be deduplicated, the update manager proceeds with the next firmware image. Otherwise, the update manager proceeds to block 780. At block 780, the GDDT and deduplicated firmware images may be stored or flashed to the flash memory device, a system memory such as an NVRAM, a hard drive or another firmware-accessible storage resource included at the information handling system. The deduplicated firmware images may be compressed prior to storage. In addition, a hash signature for each firmware image may be calculated and the GDDT updated. In particular, the GDDT may be flashed at a header of the flash memory device. As used herein, the term hard drive may refer to a traditional disk drive having rotating magnetic storage media or to other mass storage devices, for example, a solid state drive. The system memory, the hard drive or the storage resource may include a store or a designated directory for each one of the firmware images. The designated directory can be with an EFI system partition (ESP) of the NVRAM. A UEFI service may be used to update the locations of the firmware images and the GDDT. After block 780, the method ends.

Figure 8:
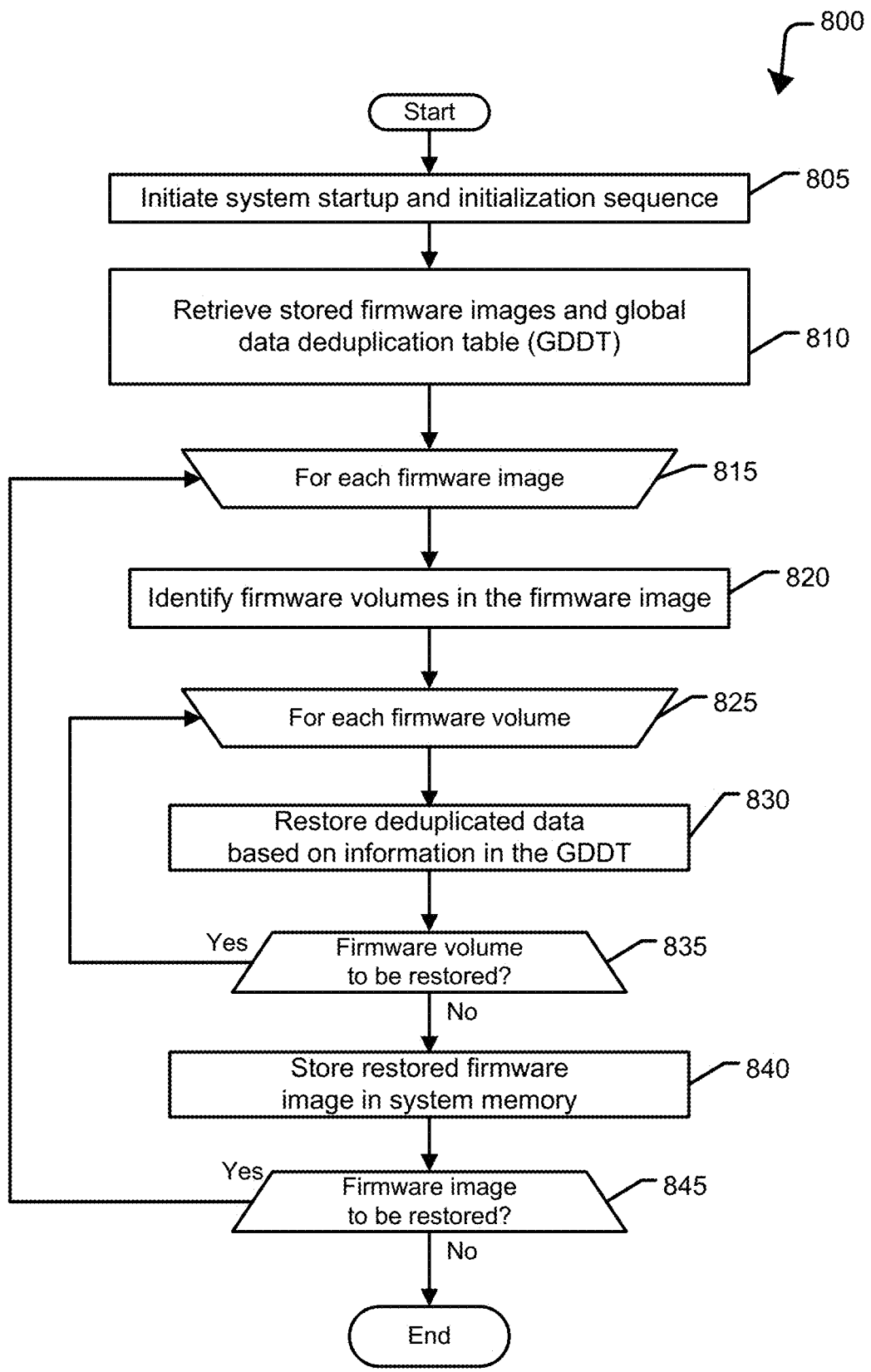
FIG. 8 is a flowchart illustrating an example of a method for restoring deduplicated firmware images according to a specific embodiment of the present disclosure.

FIG. 8 shows a method 800 for restoring the deduplicated firmware flashed at the flash memory device. The method 800 begins at block 805 where a new system startup and initialization sequence may be initiated during a boot sequence or invoked by storage of the deduplicated firmware image at the flash memory device. A boot mode variable may have been set to indicate that the next boot of information handling system should use the updated firmware image stored at a flash memory device. The system startup and initialization sequence may first decompress, reassemble and/or restore the updated firmware image(s) stored in the flash memory device according to a priority such as the next/immediate loadable firmware image may be deduplicated prior to its execution ensuring that the boot time is optimized. Another variable may be used to indicate that the firmware image in the flash memory device may be deduplicated and therefore needs to be restored prior to its execution. At block 810, the contents of the flash memory device may be retrieved and copied to the system memory. In another embodiment, each firmware image may be copied to the system prior to its execution. The GDDT may be accessed and/or copied to the system memory. Because the GDDT is secured, a private key may be required to unlock the GDDT and gain access to its entries. Because the GDDT may also encrypted, the authorized process and/or firmware may use a cryptographic key to decrypt the contents of the GDDT.

At block 815, the firmware images may be traversed for restoration. The firmware images may be traversed as structured in the system memory, according to a list, or based on various factors. The firmware being restored may be referred to as a current firmware image. The factors may include a GUID and/or hash signature of the firmware image, as predetermined by the system startup and initialization process. For example, the system startup and initialization process may deduplicate the next loadable firmware image. The method may set a flag after the current firmware image has been restored. At block 820, the firmware volumes in the current firmware image to be restored are identified. Information in the GDDT may be used to determine how many firmware volumes are in the current firmware image, the sizes of the firmware volumes, the location of the firmware volumes, and the data patterns to be restored.

At block 825, the firmware volumes may be traversed for restoration. The firmware volumes may be traversed as structured in the system memory, as structured in the GDDT, according to a list, or based on various factors such as the location of the firmware volume, the size of the firmware volume, as predetermined by the system startup and initialization process, etc. The method proceeds to block 830. At block 830, the current firmware volume may be restored from the deduplicated data based on the information in the GDDT. The restoration may involve identifying the size of the firmware volume, and then use the start offset and the end offset to determine the location of the firmware volume. The restoration may involve restoring the data blocks in the firmware volume one data block at a time. The restoration may involve restoring the sub-blocks in the data block one sub-block at a time. Prior to restoration, the firmware image, data block, and sub-block may be validated or verified. Restoration may not be performed if the firmware image and/or data block fails validation or verification.

Unique data in the deduplicated data blocks may first be restored or moved to its original location in the data block using the range of offsets associated with each sub-block or group of the unique data. The sub-blocks of data patterns may also be restored using the index arrays of the data patterns which may identify the instance of the data unit associated with the data patterns. The GDDT may be queried to determine the hash signature, source index, the source offset, the source length, the destination offset, the destination length of the data patterns, and the actual data unit such as the ASCII code, hexadecimal code, etc. The restoration may be performed according to an algorithm. For example, the duplicate data patterns may be restored first, then the uniformly repeated patterns, and finally the uniquely repeated patterns in the uniformly repeated patterns sub-blocks.

At block 835, the method determines if there is another firmware volume to be restored. If there is another firmware volume to be restored, then the method proceeds to block 825. Otherwise, the method proceeds to block 840. At block 840, the restored firmware image is stored in the system memory to be used for execution. A flag may be updated to indicate that the current firmware image has been restored. The method proceeds to block 845. At block 845, the method determines if there is another firmware image to be restored. If there is another firmware image to be restored, then the method proceeds to block 815. Otherwise, the method ends.

The above examples refer to the BIOS firmware component. However, those skilled in the art will readily appreciate that other firmware components may be updated as disclosed in the current application. In addition, the firmware update manager may be external or internal to the information handling system. Referring back to FIG. 1, the information handling system 100 can include a set of instructions that can be executed to cause the information handling system to perform any one or more of the methods or computer-based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at information handling system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or another network.

In an alternative embodiment, dedicated hardware implementations such as application specific integrated circuits, programmable logic arrays, and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for updating firmware, the method comprising:
   receiving a firmware update package at an information handling system, the firmware update package including a firmware image;
   deduplicating the firmware image, wherein the deduplicating includes:
     dividing the firmware image into a plurality of firmware volumes;
     dividing at least one of the firmware volumes into a plurality of data blocks, determining one or more data patterns in each one of the data blocks;
     dividing the each one of the data blocks into one or more sub-blocks based on the one or more data patterns;
     determining whether the one or more sub-blocks include non-repeated data;
     removing the one or more data patterns in the one or more sub-blocks except for the non-repeated data; and
     subsequent to the removing of the one or more data patterns, consolidating the non-repeated data into a contiguous space and determining an offset associated with the non-repeated data based on the contiguous space;
   generating an encrypted global data deduplication table that includes a hash signature of the one or more data patterns and an index array associated with the one or more of the data patterns, wherein the index array includes a location of the one or more data patterns and the offset of the non-repeated data;
   updating the firmware at the information handling system with the deduplicated firmware image;
   invoking an initialization procedure at the information handling system, wherein the initialization procedure includes execution of the updated firmware; and
   restoring the updated firmware based on the encrypted global data deduplication table prior to the execution.

2. The method of claim 1, wherein the one or more data patterns include a uniformly repeated data pattern, a uniquely repeated data pattern, and a non-unique data pattern.

3. The method of claim 1, wherein the index array associated with the one or more data patterns include a plurality of offsets associated with the one or more data patterns.

4. The method of claim 1, wherein the offset is associated with a size of the non-repeated data.

5. The method of claim 1, wherein the location of the one or more data patterns includes a range of offsets.

6. The method of claim 1, further comprising calculating a first hash signature for a first data block.

7. The method of claim 6, further comprising comparing the first hash signature of the first data block to a second hash signature of a second data block to determine differences between the first data block and the second data block.

8. The method of claim 7, wherein the encrypted global data deduplication table includes the first hash signature and the second hash signature.

9. The method of claim 1, further comprising flashing the encrypted global data deduplication table at a flash memory device of the information handling system.

10. The method of claim 1, further comprising securing access to the encrypted global data deduplication table with a cryptographic key.

11. The method of claim 1, wherein the restoring the updated firmware includes restoring the firmware volumes.

12. The method of claim 11, wherein restoring the firmware volumes includes restoring the one or more data patterns within the data blocks based on the encrypted global data deduplication table.

13. A method for updating firmware, the method comprising:
generating a firmware update package, the firmware update package including a firmware image;
transmitting the generated firmware update package to an information handling system;
deduplicating the firmware image, wherein the deduplicating includes:
dividing the firmware image into a plurality of firmware volumes;
dividing at least one of the firmware volumes into a plurality of data blocks;
determining one or more data patterns in at least one of the data blocks;
dividing the at least one of the data blocks into one or more sub-blocks based on the one or more data patterns;
determining whether the one or more sub-blocks includes non-repeated data;
removing the one or more data patterns in the one or more sub-blocks from the data blocks except the non-repeated data; and
subsequent to the removing of the one or more data patterns, consolidating the non-repeated data into a contiguous space and determining an offset associated with the non-repeated data based on the contiguous space;
generating an encrypted global data deduplication table that includes an index array associated with the one or more data patterns, wherein the index array identifies a location of the one or more data patterns and the offset associated with the non-repeated data; and
updating the firmware with the deduplicated firmware image.

14. The method of claim 13, further comprising, storing the encrypted global data deduplication table at a header of an SPI flash memory device of the information handling system.

15. The method of claim 13, further comprising:
invoking an initialization procedure at the information handling system, wherein the initialization procedure includes execution of the updated firmware; and
restoring the updated firmware based on the encrypted global data deduplication table prior to the execution.

16. An information handling system (IHS) comprising:
a central processing unit (CPU);
a serial peripheral interface (SPI) flash memory device; and
a system memory device to store program instructions executable by the CPU to:
receive a firmware update package at the IHS, the firmware update package including a firmware image;
deduplicate the firmware image that further includes the program instructions executable by the CPU to:
divide the firmware image into a plurality of firmware volumes;
divide at least one of the firmware volumes into a plurality of data blocks;
determine one or more data patterns in the data blocks;
divide the data blocks into one or more sub-blocks based on the one or more data patterns;
determine whether the one or more sub-blocks include non-repeated data;
remove the data patterns in the one or more sub-blocks except the non-repeated data;
consolidate the non-repeated data into a contiguous space; and
determine an offset associated with the non-repeated data based on the contiguous space;
generate an encrypted global data deduplication table, wherein the encrypted global data deduplication table includes hash signature of the one or more data patterns and an index array associated with the one or more data patterns, wherein the index array identifies a location of the one or more data patterns and the offset associated with the non-repeated data; and
flash the SPI flash memory device with the deduplicated firmware image.

17. The information handling system of claim 16, wherein the location includes a range of offsets.

18. The information handling system of claim 16, the program instructions further executable by the CPU to store the encrypted global data deduplication table at the SPI flash memory device.

19. The information handling system of claim 16, the program instructions further executable by the CPU to restore the deduplicated firmware image during an initialization of the IHS.

20. The information handling system of claim 19, the program instructions further executable by the CPU to store the restored firmware image in a system memory of the IHS prior to execution.

* * * * *